(12) United States Patent
Upshaw et al.

(10) Patent No.: US 9,989,270 B2
(45) Date of Patent: Jun. 5, 2018

(54) REDUCING PEAK ELECTRICAL DEMAND BY AIR CONDITIONING SYSTEMS AND REDUCING WATER CONSUMPTION BY IMPLEMENTING AN INTEGRATED THERMAL ENERGY AND RAINWATER STORAGE SYSTEM

(71) Applicant: Board of Regents, The University of Texas System, Austin, TX (US)

(72) Inventors: Charles R. Upshaw, Austin, TX (US); Michael E. Webber, Austin, TX (US); Joshua D. Rhodes, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 30 days.

(21) Appl. No.: 15/035,204

(22) PCT Filed: Nov. 7, 2014

(86) PCT No.: PCT/US2014/064603
§ 371 (c)(1),
(2) Date: May 6, 2016

(87) PCT Pub. No.: WO2015/073324
PCT Pub. Date: May 21, 2015

(65) Prior Publication Data
US 2016/0282002 A1     Sep. 29, 2016

Related U.S. Application Data

(60) Provisional application No. 61/904,546, filed on Nov. 15, 2013.

(51) Int. Cl.
*F24F 5/00* (2006.01)

(52) U.S. Cl.
CPC ............. *F24F 5/0017* (2013.01); *F24F 11/46* (2018.01); *F24F 2005/0025* (2013.01);
(Continued)

(58) Field of Classification Search
CPC ................... F24F 5/0017; F24F 5/0035; F24F 2005/0025; F24F 2005/0032;
(Continued)

(56) References Cited

U.S. PATENT DOCUMENTS 5,255,526 A    10/1993   Fischer
5,467,812 A    11/1995   Dean et al.
(Continued)

OTHER PUBLICATIONS

International Preliminary Report on Patentability for International Application No. PCT/US2014/064603 dated May 17, 2016, pp. 1-10.
(Continued)

*Primary Examiner* — Mohammad M Ali
(74) *Attorney, Agent, or Firm* — Robert A. Voigt, Jr.; Winstead, P.C.

(57) ABSTRACT

An integrated thermal energy and rainwater storage system for reducing peak electrical demand by air conditioning systems. Such a system includes a water conveyance system for collecting and conveying water to a storage tank for storing rainwater, where the rainwater functions as a lower temperature thermal reservoir while it is being held and awaiting use. The system further includes a residential air conditioning system with an air-cooled condenser unit along with an additional water-to-refrigerant heat exchanger connected to the storage tank on one side, and on the other side connected into the refrigerant lines with reconfigurable flow paths and actuated valves to control the discharging and recharging of the thermal energy storage. The lower temperature and better heat transfer capabilities of the rainwater improve operating efficiency and reduce power consumption (Continued)

of the compressor when used instead of the air-cooled condenser during the hottest hours of the day.

18 Claims, 9 Drawing Sheets

(52) U.S. Cl.
CPC ... *F24F 2005/0032* (2013.01); *F24F 2140/60* (2018.01); *Y02E 60/147* (2013.01)

(58) Field of Classification Search
CPC ......... F24F 2006/006; F24F 2011/0075; F24F 2203/02; F24F 5/0071; Y02E 60/147; Y02B 30/52; Y02B 30/12
USPC ......................................... 62/59, 79
See application file for complete search history.

(56) References Cited

U.S. PATENT DOCUMENTS

| | | | | |
|---|---|---|---|---|
| 5,647,225 | A | * | 7/1997 | Fischer ................. F24F 5/0017 62/434 |
| 5,678,626 | A | * | 10/1997 | Gilles .................. F24F 5/0017 165/62 |
| 5,755,104 | A | | 5/1998 | Rafalovich et al. |
| 5,906,104 | A | | 5/1999 | Schwartz et al. |
| 2004/0262206 | A1 | | 12/2004 | Gettman |
| 2005/0016906 | A1 | | 1/2005 | Gettman |
| 2006/0037329 | A1 | * | 2/2006 | Narayanamurthy .. F24F 5/0017 62/59 |
| 2008/0307806 | A1 | * | 12/2008 | Campbell ............. F24F 5/0017 62/121 |

OTHER PUBLICATIONS

Upshaw et al., "Modeling Peak Load Reduction and Energy Consumption Enabled by an Integrated Thermal Energy and Water Storage System for Residential Air Conditioning Systems in Austin, Texas." Energy and Buildings, vol. 97, 2015, pp. 21-32.

Charlie Upshaw, Presentation entitled "Modeling Peak Load Reduction and Energy Consumption Enabled by an Integrated Thermal Energy and Water Storage System for Residential Air Conditioning Systems in Austin, Texas," UT Energy Symposium, Student Research Showcase, Nov. 6, 2014, pp. 1-35.

Upshaw et al., "Modeling a Combined Energy-Water Storage System for Residential Homes and Analyzing Water Storage Tank Size," ASME 2013 International Mechanical Engineering Congress and Exposition, San Diego, California, USA, Nov. 15-21, 2013, pp. 1-11.

Written Opinion of the International Searching Authority for International Application No. PCT/US2014/064603 dated Feb. 12, 2015, pp. 1-8.

* cited by examiner

REDUCING PEAK ELECTRICAL DEMAND BY AIR CONDITIONING SYSTEMS AND REDUCING WATER CONSUMPTION BY IMPLEMENTING AN INTEGRATED THERMAL ENERGY AND RAINWATER STORAGE SYSTEM

CROSS REFERENCE TO RELATED APPLICATIONS

This application claims priority to U.S. Provisional Patent Application Ser. No. 61/904,546, "Reducing Peak Electrical Demand by Air Conditioning Systems and Reducing Water Consumption by Implementing an Integrated Thermal Energy and Rainwater Storage System," filed Nov. 15, 2013, which is incorporated by reference herein in its entirety.

TECHNICAL FIELD

The present invention relates generally to air conditioning systems and on-site water collection and storage systems, and more particularly to reducing peak electrical demand by air conditioning systems and reducing water consumption by implementing an integrated thermal energy and rainwater storage system.

BACKGROUND

Air conditioning ("AC") systems are the primary driver of summer electricity use and peak power demand in certain parts of the country, such as Texas, mostly due to the refrigerant compressor in the condenser unit, with residential home and commercial AC systems contributing significantly to the peak demand. The power demand for a residential AC compressor is on the order of kilowatts.

Due to the tightening capacity margins of the power grid, and the corresponding increase in prices during peak demand hours in the summer (usually in the afternoon and early evening), utilities are seeking methods of reducing power demand. Since air conditioning systems are a significant contributor to the peak load, reducing the air conditioning load could help alleviate the problem.

Air conditioning use typically aligns with peak demand, especially during hot summer months, leading to higher wholesale prices in the afternoon and early evening. Utilities selling power on a flat rate are at risk of losing money during these peaks if power is more expensive to generate or purchase on the wholesale market than the price they sell it to the customers. If utilities can reduce peak demand, they might avoid high peak-time costs. If the utility offers the homeowner/customer time-of-use or real-time pricing, it would be financially valuable to the electricity customer to reduce consumption during those time periods, since the electricity would be more expensive per kilowatt hour than during off-peak times. Additionally, if the overall energy consumption could be reduced, it would provide even more direct savings to the homeowner.

Thermal energy storage is a method pre-cooling a thermal mass or medium that will later be drawn upon to assist or replace the AC condenser. The concept of thermal storage is not new, and is in widespread use in large-scale AC systems for the commercial and industrial sectors. However, smaller thermal storage systems, such as for residential and small commercial applications, while available, are not widespread due to high costs relative to the costs of the AC system.

At the same time, many of the regions with high air conditioning demand also face, or are at risk of, water scarcity problems. A significant amount of water is used by buildings (both residential and commercial) for non-potable uses, including irrigation and flushing toilets. One way to help mitigate water use is to capture and store rainwater for use onsite. Traditionally, the price of municipal water in many areas has been so low that large-scale rainwater harvesting systems are not economically practical. However, as drought depletes water reserves, rates are going up and many cities are imposing strict water use standards, and rainwater systems are receiving renewed interest. Large rainwater collection systems could help reduce building water demands, and reduce reliance on regional reservoirs and municipal water treatment and conveyance systems.

Unfortunately, there is not currently a means for integrating a thermal storage system with an on-site water collection and storage system into a single combined system to reduce the overall cost and to reduce redundant components. Such a combined energy/water storage configuration may increase the cost effectiveness of both a thermal storage system and a rainwater collection system by means of shared costs, avoided energy and water expenses as well as improve grid reliability thereby potentially financially benefiting both the electricity/water customer and the electricity/water utilities.

BRIEF SUMMARY

In one embodiment of the present invention, an integrated thermal energy and water storage system comprises a refrigerant circulation network. The system further comprises a storage tank configured to store water, where a thermal mass of the water is used as a thermal storage medium. The system additionally comprises a water conveyance system configured to capture, direct and move water from one or more sources into and out of the storage tank. Furthermore, the system comprises an evaporator connected to the refrigerant circulation network, where the evaporator is configured to evaporate refrigerant into a refrigerant vapor thereby extracting heat from a cooled space. Additionally, the system comprises a compressor connected to the refrigerant circulation network, where the compressor is configured to pressurize and circulate the refrigerant around the system and where the compressor compresses the refrigerant vapor. In addition, the system comprises an air-cooled condenser connected to the refrigerant circulation network, where the air-cooled condenser is configured to condense the refrigerant vapor thereby removing heat energy from the water in the tank and rejecting the heat energy to the atmosphere. The system further includes a water-to-refrigerant heat exchanger connected to the refrigerant circulation network, where the water-to-refrigerant heat exchanger is configured to either evaporate or condense the refrigerant depending on an operational mode of the system. The water in the storage tank is re-cooled by the refrigerant in the late evening and/or early morning. The refrigerant from the compressor is condensed by the water in the water-to-refrigerant heat exchanger during a first mode of operation of the system, where the refrigerant is then expanded during the first mode of operation and directed to the evaporator during peak times of electrical demand to be evaporated into the refrigerant vapor. The refrigerant vapor is directed to the water-to-refrigerant heat exchanger during the first mode of operation, where the water from the storage tank condenses the refrigerant vapor as opposed to being directed to the air-cooled condenser during the first mode of operation thereby allowing the water from the storage tank to function as a heat sink instead of outdoor air cooling the air-cooled condenser during the peak times of electrical demand.

In another embodiment of the present invention, a method for reducing peak electrical demand by air conditioning systems comprises routing compressed and condensed refrigerant from an air-cooled condenser to a first expansion valve to be expanded. The method further comprises directing the refrigerant expanded by the first expansion valve to a water-to-refrigerant heat exchanger to re-cool water in a storage tank during off-peak times of electrical demand in a late evening and/or early morning. The method further comprises routing the refrigerant from the water-to-refrigerant heat exchanger to a second expansion value or the first expansion valve to be expanded during peak times of electrical demand. The method additionally comprises directing the refrigerant expanded by the second expansion value to an evaporator during the peak times of electrical demand to be evaporated into a refrigerant vapor. In addition, the method comprises directing the refrigerant vapor to the water-to-refrigerant heat exchanger connected to the storage tank as opposed to being directed to the air-cooled condenser thereby allowing the water in the storage tank to function as a heat sink instead of the air-cooled condenser during the peak times of electrical demand.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
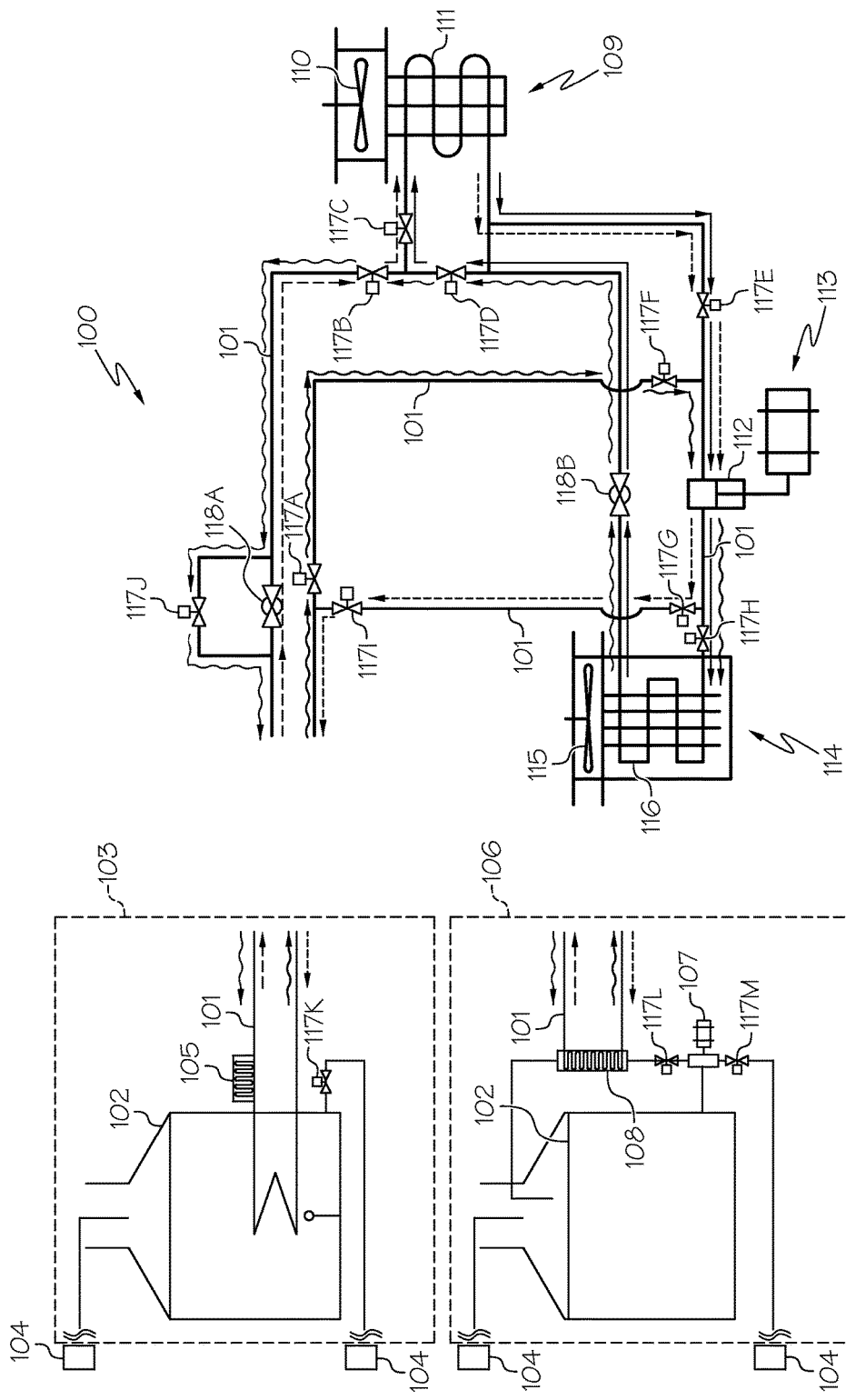
FIG. 1 illustrates a combined rainwater and thermal storage system depicting both passive and active water/refrigerant heat exchange and water tank configurations in accordance with an embodiment of the present invention.

While the following discusses the present invention in connection with a cooling-climate thermal storage, the integrated thermal energy and rainwater storage system of the present invention can be modified to a heating-climate thermal storage or to operate on a water collection and conveyance system other than rainwater. Other embodiments include using a multi-stage compressor, where some of the stages are bypassed in the water-cooled mode so that the system operates even more efficiently. Likewise, two separate compressors could be used such that each one is dedicated to either an air-cooled or water-cooled mode, where each compressor is sized for maximum efficiency in their mode. Similarly, the exact configuration of valves and expansion valves can be utilized in any number of ways. A person of ordinary skill in the art would be capable of applying the principles of the present invention to such implementations. Further, embodiments applying the principles of the present invention to such implementations would fall within the scope of the present invention.

As stated in the Background section, due to the tightening capacity margins of the power grid, and the corresponding increase in prices during peak demand hours in the summer (usually in the afternoon and early evening), utilities are seeking methods of reducing power demand. Since air conditioning systems are a significant contributor to the peak load, reducing the air conditioning load could help alleviate the problem. Air conditioning use typically aligns with peak demand, especially during hot summer months, leading to higher wholesale prices in the afternoon and early evening. Utilities selling power on a flat rate are at risk of losing money during these peaks if power is more expensive to generate or purchase on the wholesale market than the price they sell it to the customers. If utilities can reduce peak demand, they might avoid high peak-time costs. If the utility offers the homeowner/customer time-of-use or real-time pricing, it would be financially valuable to the electricity customer to reduce consumption during those time periods, since the electricity would be more expensive per kilowatt hour than during off-peak times. Additionally, if the overall energy consumption could be reduced, it would provide even more direct savings to the homeowner.

Thermal energy storage is a method pre-cooling a thermal mass or medium that will later be drawn upon to assist or replace the AC condenser. The concept of thermal storage is not new, and is in widespread use in large-scale AC systems for the commercial and industrial sectors. However, smaller thermal storage systems, such as for residential and small commercial applications, while available, are not widespread due to high costs relative to the costs of the AC system.

At the same time, many of the regions with high air conditioning demand also face, or are at risk of, water scarcity problems. A significant amount of water is used by buildings (both residential and commercial) for non-potable uses, including irrigation and flushing toilets. One way to help mitigate water use is to capture and store rainwater for use onsite. Traditionally, the price of municipal water in many areas has been so low that large-scale rainwater harvesting systems are not economically practical. However, as drought depletes water reserves, rates are going up and many cities are imposing strict water use standards, and rainwater systems are receiving renewed interest. Large rainwater collection systems could help reduce building water demands, and reduce reliance on regional reservoirs and municipal water treatment and conveyance systems.

Unfortunately, there is not currently a means for integrating a thermal storage system with an on-site water collection and storage system into a single combined system to reduce the overall cost and to reduce redundant components. Such a combined energy/water storage configuration may increase the cost effectiveness of both a thermal storage system and a rainwater collection system by means of shared costs, avoided energy and water expenses as well as improve grid reliability thereby potentially financially benefiting both the electricity/water customer and the electricity/water utilities.

Figure 2:
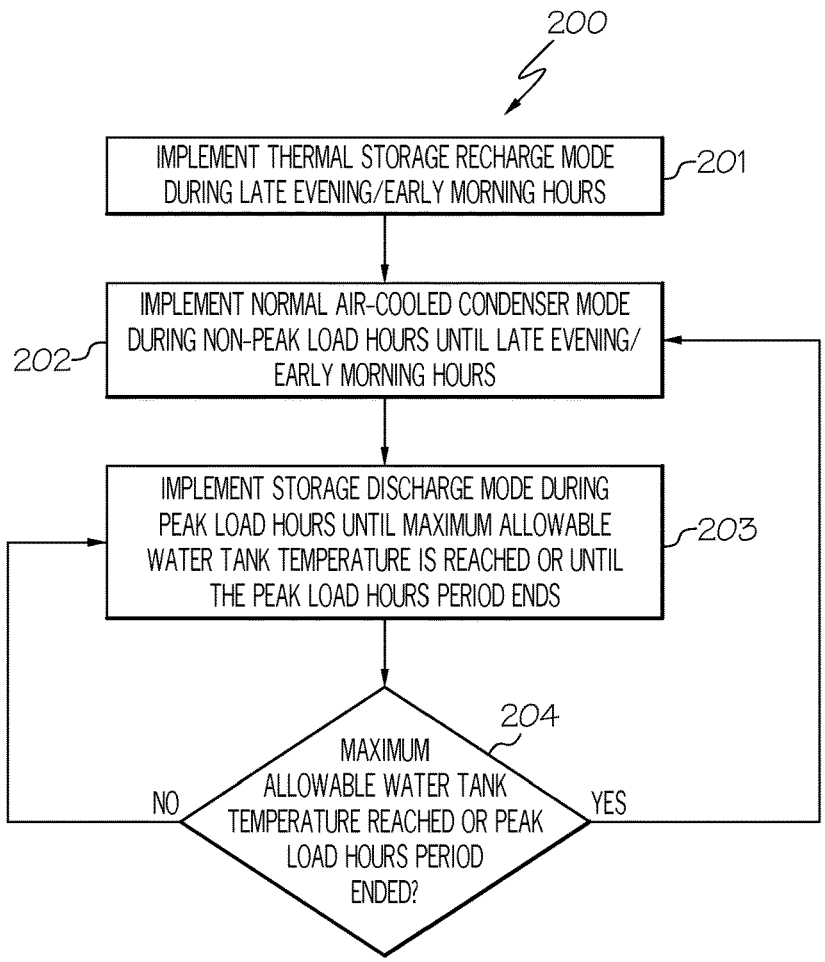
FIG. 2 is a flowchart of a method for operating the combined rainwater and thermal storage system during its three modes of operation in accordance with an embodiment of the present invention.
Figure 3A:
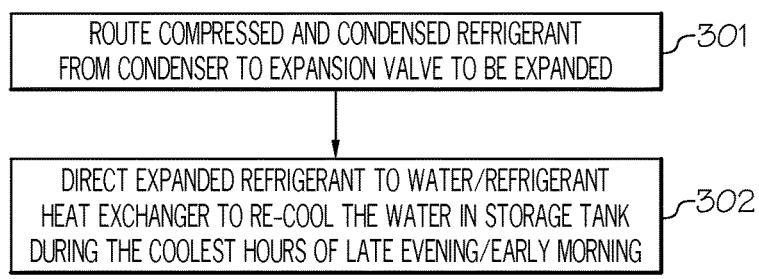
FIG. 3A illustrates the flow of refrigerant in the system during the thermal storage recharge mode in accordance with an embodiment of the present invention.
Figure 3B:
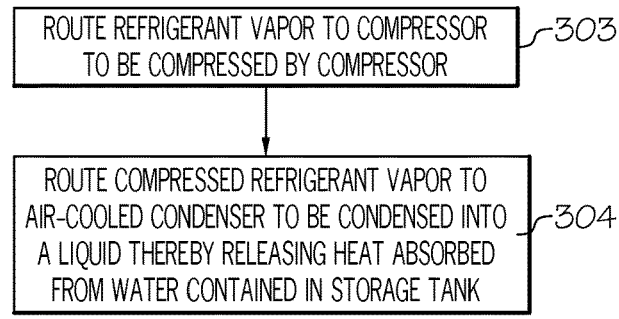
FIG. 3B illustrates the flow of refrigerant vapor during the thermal storage recharge mode in accordance with an embodiment of the present invention.
Figure 4A:
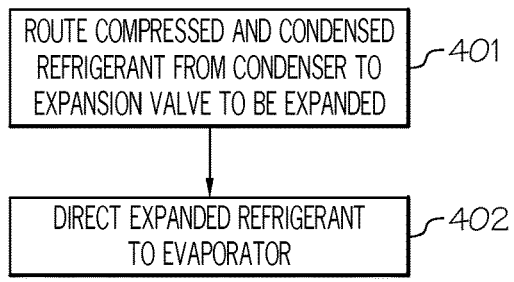
FIG. 4A illustrates the flow of refrigerant in the system during the normal air-cooled condenser mode in accordance with an embodiment of the present invention.
Figure 4B:
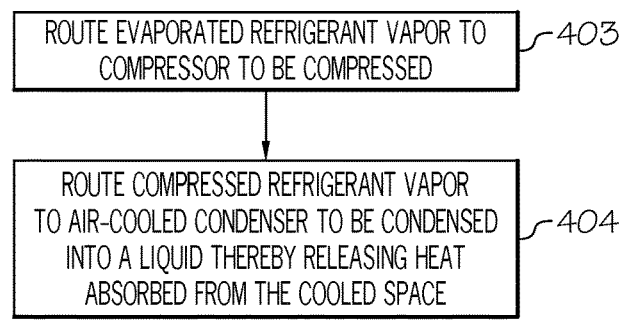
FIG. 4B illustrates the flow of refrigerant vapor during the normal air-cooled condenser mode in accordance with an embodiment of the present invention.
Figure 5A:
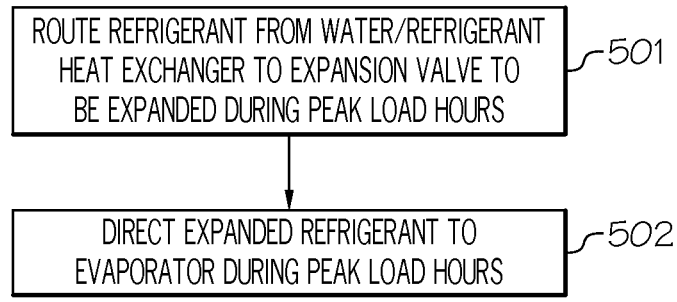
FIG. 5A illustrates the flow of refrigerant in the system during the thermal storage discharge mode in accordance with an embodiment of the present invention.
Figure 5B:
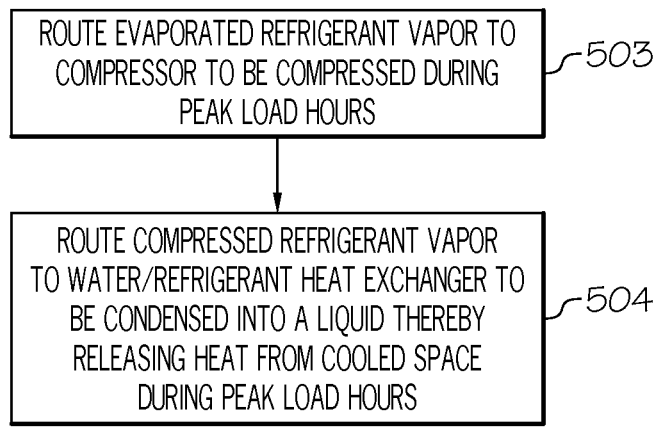
FIG. 5B illustrates the flow of refrigerant vapor during the thermal storage discharge mode in accordance with an embodiment of the present invention.
Figure 6:
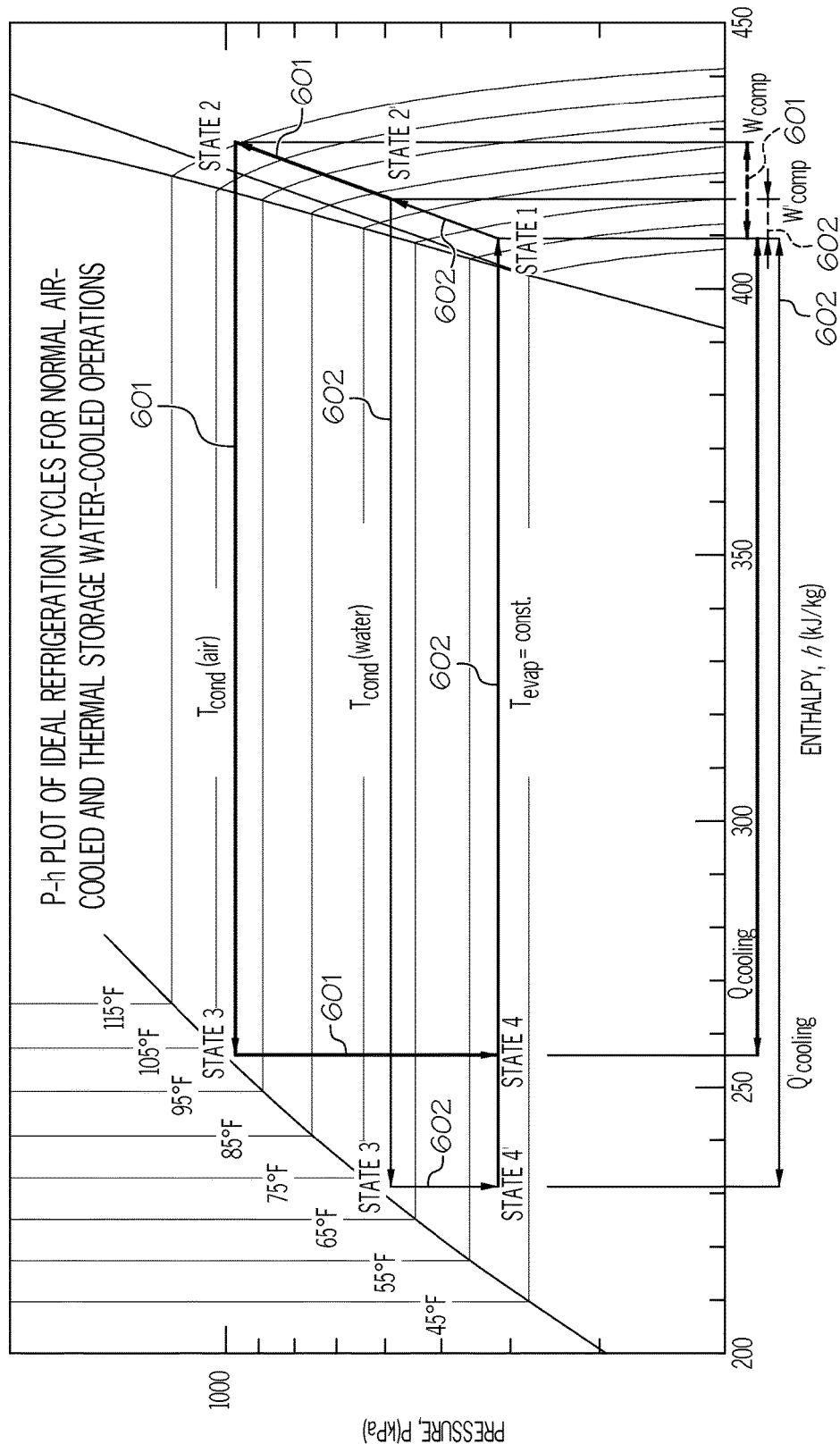
FIG. 6 is a pressure-specific enthalpy diagram that describes the states of the cooling cycle model and demonstrates the improved efficiency of the thermal storage in accordance with an embodiment of the present invention.
Figure 7:
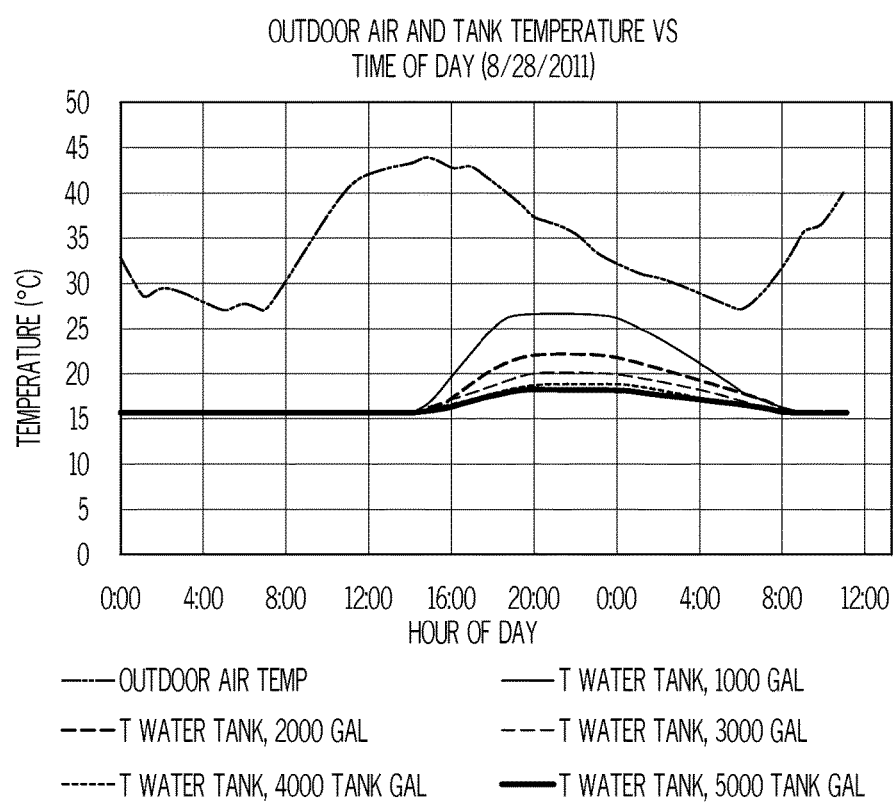
FIG. 7 is a plot of outdoor air temperature as well as the variation in tank temperature on the hottest day of the year for various tanks sizes in accordance with an embodiment of the present invention.
Figure 8:
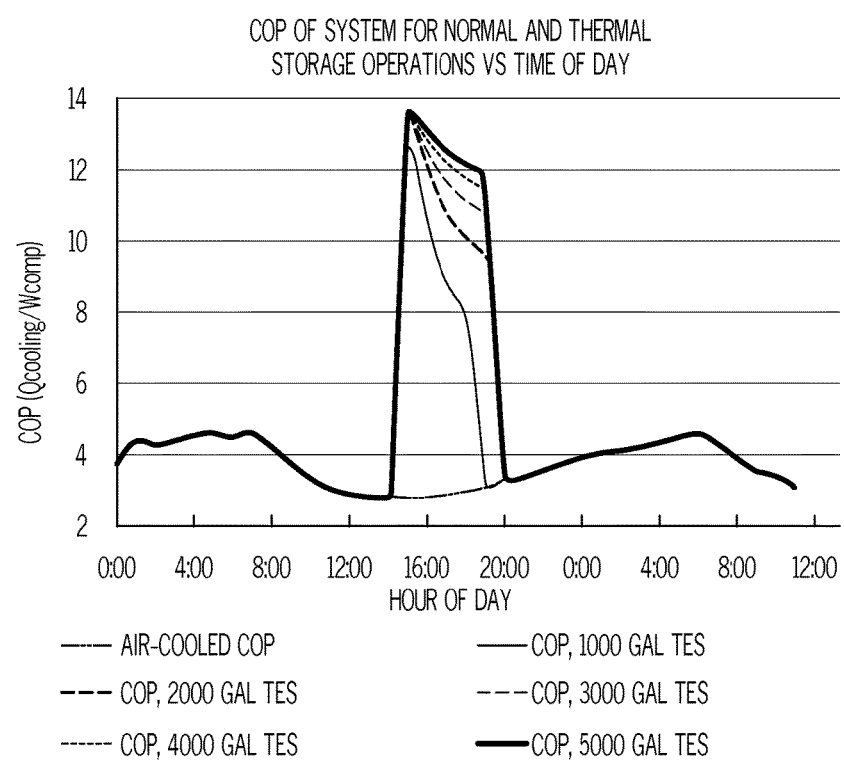
FIG. 8 is a graph of the Coefficient of Performance (COP) versus time in accordance with an embodiment of the present invention.
Figure 9:
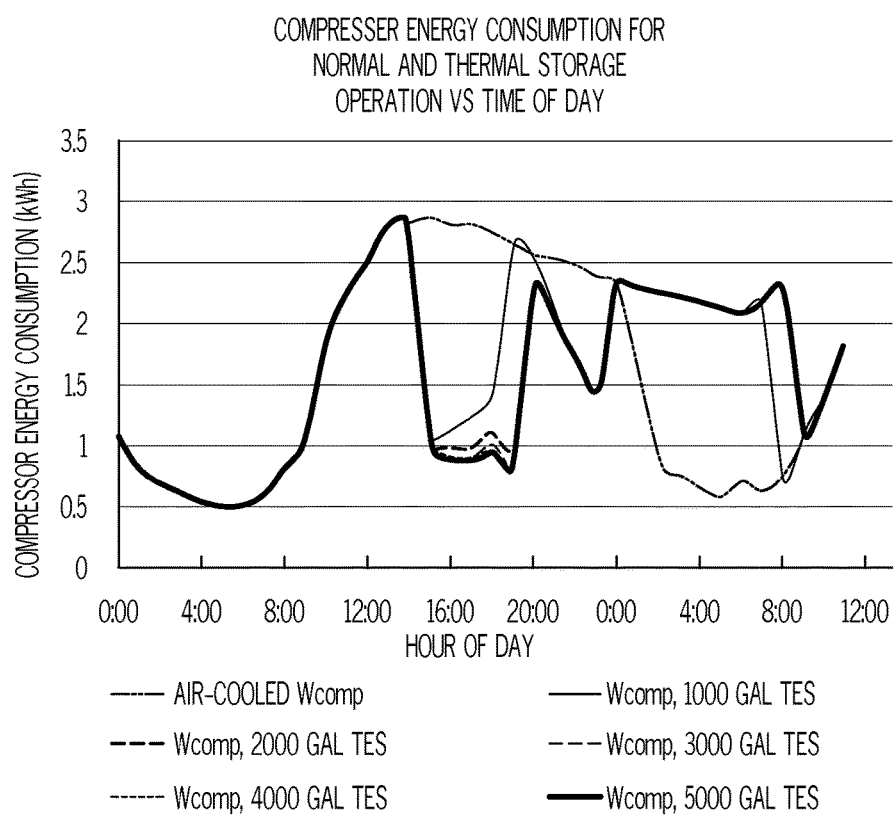
FIG. 9 is a plot of the compressor energy consumption during each hour for the cases shown in FIG. 7 in accordance with an embodiment of the present invention.
Figure 10:
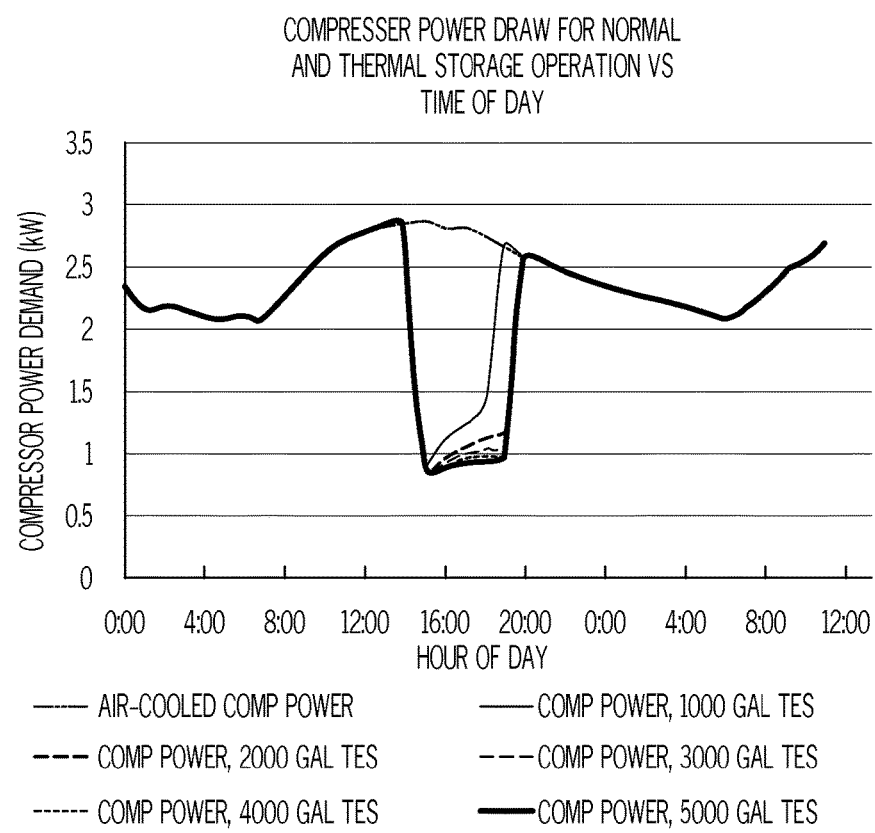
FIG. 10 is a graph depicting the compressor power draw for normal and thermal storage operation versus the time of day in accordance with an embodiment of the present invention.

The principles of the present invention provide a means for integrating a thermal storage system with an on-site water collection and storage system into a single combined system to reduce the overall cost and to reduce redundant components as discussed below in connection with FIGS. 1-2, 3A-3B, 4A-4B, 5A-5B and 6-10. FIG. 1 illustrates a combined rainwater and thermal storage system depicting both passive and active water/refrigerant heat exchange and water tank configurations. FIG. 2 is a flowchart of a method for operating the combined rainwater and thermal storage system during its three modes of operation. FIG. 3A illustrates the flow of refrigerant in the system during the thermal storage recharge mode. FIG. 3B illustrates the flow of refrigerant vapor during the thermal storage recharge mode. FIG. 4A illustrates the flow of refrigerant in the system during the normal air-cooled condenser mode. FIG. 4B illustrates the flow of refrigerant vapor during the normal air-cooled condenser mode. FIG. 5A illustrates the flow of refrigerant in the system during the thermal storage discharge mode. FIG. 5B illustrates the flow of refrigerant vapor during the thermal storage discharge mode. FIG. 6 is a pressure-specific enthalpy diagram that describes the states of the cooling cycle model and demonstrates the improved efficiency of the thermal storage. FIG. 7 is a plot of outdoor air temperature as well as the variation in tank temperature on the hottest day of the year for various tanks sizes. FIG. 8 is a graph of the Coefficient of Performance (COP) versus time. FIG. 9 is a plot of the compressor energy consumption during each hour for the cases shown in FIG. 7. FIG. 10 is a graph depicting the compressor power draw for normal and thermal storage operation versus the time of day.

The integrated thermal energy and rainwater storage system of the present invention integrates a rainwater collection system with an HVAC system as a thermal storage medium. A typical residential rainwater collection system might need to be on the order of several thousands of gallons of water to provide enough storage to capture a significant portion of the rainfall onto the house, but such a system usually costs more than it is worth because of low prevailing municipal water prices. The idea to improve value is that a homeowner could not only capture and store rainwater, but also use the thermal mass of the rainwater as thermal storage to reduce their air conditioner load during the peak period of the day. Since outdoor water use (i.e., irrigation) is the typical use for captured rainwater, and presumably the irrigation would use municipal water as a backup, it is assumed that the tank would be kept sufficiently full of water from rainfall and/or municipal water. The concept could be expanded to cover other uses of rainwater, including both potable and non-potable indoor use. The concept could also be expanded to cover other sources of captured or recycled water, including gray water, treated wastewater, AC condensate, lake water, river water, ocean water, stormwater runoff and well water. The water tank thermal mass acts as a heat sink for the condenser portion of the cycle, and so pre-cooling the volume down to a temperature significantly lower than the outdoor air temperature, along with the comparatively better heat transfer properties of water, allows the cycle to run at much higher efficiency with lower power demand as discussed further below.

Referring now to the Figures in detail, FIG. 1 illustrates a combined rainwater and thermal storage system 100 depicting both passive and active water/refrigerant heat exchange and water tank configurations in accordance with an embodiment of the present invention. System 100 includes a refrigerant circulation network 101 configured to circulate refrigerant throughout system 100. System 100 further includes a rainwater and thermal energy storage tank 102 configured to store water, such as rainwater and/or municipal water. In one embodiment, storage tank 102 is used in connection with a passive water/refrigerant heat exchanger configuration 103 connected to a water conveyance system 104 configured to capture, direct and move water from one or more sources (e.g., rainwater, municipal water) into and out of storage tank 102. Passive water/refrigerant heat exchanger configuration 103 includes a water-to-refrigerant heat exchanger 105 connected to tank 102 that is cooled through natural convection. In another embodiment, storage tank 102 is used in connection with an active water/refrigerant heat exchanger configuration 106 connected to water conveyance system 104. Active water/refrigerant heat exchanger configuration 106 includes a water pump 107 configured to pump water either through a water-to-refrigerant heat exchanger 108 connected to tank 102 or to water conveyance system 104 to be used for various uses (e.g., irrigation). Each water/refrigerant heat exchanger 105, 108 is connected to refrigerant circulation network 101 and configured to either evaporate or condense the refrigerant depending on the operational mode of system 100 as discussed further below.

System 100 further includes an evaporator 109, which is connected to refrigerant circulation network 101, along with an air handling unit fan 110. Evaporator 109, which includes an evaporator coil 111, evaporates the refrigerant into a vapor taking the heat from the cooled space with it. Fan 110 is configured to circulate air over coil 111 assisting in the process of evaporating the refrigerant into a vapor taking the heat from the cooled space with it. Additionally, system 100 includes a compressor 112 connected to refrigerant circulation network 101 which is driven by an electric motor 113, where compressor 112 is configured to pressurize and circulate refrigerant around system 100 as well as configured to compress the refrigerant vapor. Furthermore, compressor 112 is configured to cause pressure changes, such as compressing the refrigerant to a higher pressure resulting in a higher temperature. In addition, system 100 includes an air-cooled condenser 114 connected to refrigerant circulation network 101 along with a condenser fan 115. Air-cooled condenser 114 is configured to condense the refrigerant vapor (discussed further below) into a liquid thus releasing the heat previously absorbed from the cooled space by flowing cool air across heat exchanger coil 116 by fan 115. That is, air-cooled condenser 114 is configured to condense the refrigerant vapor thereby removing heat energy from the water in storage tank 102 and rejecting the heat energy to the atmosphere.

System 100 further includes various actuated valves 117A-117J configured to reconfigure system 100 to operate in one of three different modes of operation as discussed further below. In the embodiment directed to the passive water/refrigerant heat exchanger configuration 103, a valve 117K is used to control water flow from tank 102 to water conveyance system 104. In the embodiment directed to the active water/refrigerant heat exchanger configuration 106, valves 117L and 117M are used to control the flow of water to and from heat exchanger 108 and to and from water conveyance system 104. Valves 117A-117M may collectively or individually be referred to as valves 117 or valve 117, respectively. Each valve 117 is configured to regulate, direct or control the flow of condensed refrigerant or evaporated refrigerant vapor as discussed further below. Valves 117 and refrigerant paths 101 could be combined or changed, depending on the type of valve or manifold used. In addition, valves 117 could include solenoid valves (e.g., valve 117J), where the valve is controlled by an electric current through a solenoid, configured to open, close or redirect the flow of refrigerant.

System 100 additionally includes expansion valves 118A-118B configured to expand the refrigerant as discussed further below. Expansion valves 118A-118B may collectively or individually be referred to as expansion valves 118 or expansion valve 118, respectively.

A more detailed description of the functionality of the components of system 100 is discussed further below in connection with FIGS. 3A-3B, 4A-4B and 5A-5B.

System 100 is not to be limited in scope to the depicted elements. System 100 may include other auxiliary valves, flow path bypasses, potential water filtration and/or treatment systems, sensors, electrical control elements and other components that were not depicted for ease of understanding.

As discussed above, system 100 operates in three different modes of operation. These modes of operation are operated during different times of the day, such as during non-peak load hours during the day, during the late evening/early morning hours or during the peak load hours during the day, as discussed below in connection with FIG. 2. System 100 operates each mode of operation based on valves 117 reconfiguring the refrigerant path and refrigerant vapor path as discussed below in connection with FIG. 2 and illustrated in FIG. 1.

FIG. 2 is a flowchart of a method 200 for operating system 100 during its three modes of operation in accordance with an embodiment of the present invention.

Referring to FIG. 2, in conjunction with FIG. 1, in step 201, system 100 implements a mode, referred to herein as the "thermal storage recharge mode," during the late evening/early morning hours to re-cool or recharge storage tank 102 as discussed in further detail below in connection with FIGS. 3A-3B. Ideally, system 100 recharges fully during the coolest hours of the early morning to bring system 100 back to the starting tank temperature allowing for full thermal storage capacity for the next day as discussed in greater detail below.

FIG. 3A illustrates the flow of refrigerant in system 100 during the thermal storage recharge mode in accordance with an embodiment of the present invention. Referring to FIG. 3A, in conjunction with FIGS. 1-2, in step 301, the compressed and condensed refrigerant from condenser 114 is routed to expansion valve 118B to be expanded. In step 302, the expanded refrigerant is directed to the water/refrigerant heat exchanger 105, 108 via valves 117D, 117B, 117J to re-cool or "recharge" the water in storage tank 102 during the coolest hours of the late evening/early morning. Ideally, system 100 recharges fully during the coolest hours of the early morning to bring system 100 back to the starting tank temperature allowing for full thermal storage capacity for the next day. Ideally, recharge occurs out of phase with any potential AC cycling, such that the air conditioning system is running uninterrupted, directing refrigerant to evaporator 109 as needed to meet thermal loads, but redirecting the refrigerant back to water/refrigerant heat exchanger 105, 108 once the evaporator cooling load is met. Ideally, such reconfiguration from evaporator 109 to water/refrigerant heat exchanger 105, 108 would occur without requiring the system to cycle off for any appreciable amount of time, minimizing downtime.

When the refrigerant re-cools the water in storage tank 102 through water/refrigerant heat exchanger 105, 108, heat is absorbed and evaporation occurs. FIG. 3B illustrates the flow of refrigerant vapor during the thermal storage recharge mode in accordance with an embodiment of the present invention. Referring to FIG. 3B, in conjunction with FIGS. 1-2, in step 303, the refrigerant vapor is routed to compressor 112 from water/refrigerant heat exchanger 105, 108 via valves 117A, 117F to be compressed by compressor 112. In step 304, the compressed refrigerant vapor is routed to condenser 114 via valve 117H to be condensed into a liquid thereby releasing heat absorbed from water contained in storage tank 102.

Returning to FIG. 2, in conjunction with FIG. 1, upon completing implementation of the thermal storage recharge mode to recharge water storage tank 102, in step 202, system 100 implements the mode, referred to herein as the "normal air-cooled condenser mode," during non-peak load hours until the late evening/early morning hours as discussed in further detail below in connection with FIGS. 4A-4B.

FIG. 4A illustrates the flow of refrigerant in system 100 during the normal air-cooled condenser mode in accordance with an embodiment of the present invention. Referring to FIG. 4A, in conjunction with FIGS. 1-2, in step 401, the compressed and condensed refrigerant from condenser 114 is routed to expansion valve 118B to be expanded. In step 402, the expanded refrigerant is directed to evaporator 109 via valves 117D, 117C to be evaporated into a vapor, taking heat from the cooled space with it.

FIG. 4B illustrates the flow of refrigerant vapor during the normal air-cooled condenser mode in accordance with an embodiment of the present invention. Referring to FIG. 4B, in conjunction with FIGS. 1-2, in step 403, the refrigerant vapor is routed to compressor 112 via valves 117E to be compressed. In step 404, the compressed refrigerant vapor is routed to condenser 114 via valve 117H to be condensed into a liquid thereby releasing heat absorbed from the cooled space.

Returning to FIG. 2, in conjunction with FIG. 1, upon the beginning of the designated time period, referred to herein as the "peak load hours," in step 203, system 100 implements the mode, referred to herein as the "thermal storage discharge mode," during peak load hours until the maximum allowable temperature of storage tank 102 is reached or until the peak load hours period ends as discussed in further detail below in connection with FIGS. 5A-5B.

FIG. 5A illustrates the flow of refrigerant in system 100 during the thermal storage discharge mode in accordance with an embodiment of the present invention. Referring to FIG. 5A, in conjunction with FIGS. 1-2, in step 501, the refrigerant from water/refrigerant heat exchanger 105, 108 is routed to expansion valve 118A to be expanded during peak load hours. In an alternative embodiment, system 100 may utilize a single valve, such as expansion valve 118B, that could be switched to different expansion settings for air and water-cooled modes. In step 502, the expanded refrigerant is directed to evaporator 109 from expansion valve 118A via valves 117B, 117C during peak load hours to be evaporated into a vapor, taking heat from the cooled space with it.

FIG. 5B illustrates the flow of refrigerant vapor during the thermal storage discharge mode in accordance with an embodiment of the present invention. Referring to FIG. 5B, in conjunction with FIGS. 1-2, in step 503, the refrigerant vapor is routed to compressor 112 from evaporator 109 via valve 117E to be compressed during peak load hours. In step 504, the compressed refrigerant vapor is routed to the water/refrigerant heat exchanger 105, 108 via valves 117G, 117I, as opposed to being directed to air-cooled condenser 114, to be condensed into a liquid thereby releasing heat from the cooled space during peak load hours. As a result, the water in storage tank 102 functions as a heat sink instead of air passing through the air-cooled condenser 114 during the peak load hours, thereby reducing peak electrical demand during the peak load hours.

As discussed above, the thermal storage discharge mode of operation is operated during peak load hours until the maximum allowable water temperature in storage tank 102 is reached or until the peak period ends. Returning to FIG. 2, in conjunction with FIG. 1, in step 204, a determination is made as to whether the maximum allowable water temperature of storage tank 102 has been reached during the peak load hours or whether the peak load hours period has ended. If the maximum allowable water temperature of storage tank 102 has not been reached and the peak load hours period has not ended, then system 100 continues to operate in the thermal storage discharge mode of operation. If, however, the maximum allowable water temperature of storage tank 102 has been reached during the peak load hours or if the peak load hours period has ended, then system 100 implements the normal air-cooled condenser mode of operation as discussed above.

In some implementations, method 200, as well as the sub-steps of method 200 depicted in FIGS. 3A-3B, 4A-4B and 5A-5B, may include other and/or additional steps that, for clarity, are not depicted. Further, in some implementations, method 200, as well as the sub-steps of method 200 depicted in FIGS. 3A-3B, 4A-4B and 5A-5B, may be executed in a different order than presented. Additionally, in some implementations, certain steps in method 200, as well as the sub-steps of method 200 depicted in FIGS. 3A-3B, 4A-4B and 5A-5B, may be executed in a substantially simultaneous manner or may be omitted.

An analysis of the system configuration described above in connection with FIGS. 1-2, 3A-3B, 4A-4B and 5A-5B, will be discussed below. The purpose of this analysis is to demonstrate the order of magnitude of the potential impacts on compressor performance from implementing the integrated thermal energy and rainwater storage system 100 of the present invention.

For modeling purposes, the system (system 100) is divided into the Cooling Cycle Model (CCM) and the Water Tank Thermal Model (WTThM). The CCM models the compressor power requirement, cooling capacity, and condenser heat load based on condenser temperature. Thermodynamic property calculations use a table look-up function using thermal property tables generated with REFPROP, a property calculator software. For this first analysis, the WTThM only calculates the temperature increase in tank 102 based in a beginning temperature and heat input, but it will eventually account for the water flows into and out of tank 102 as well. These are described in more detail further below.

There were several simplifying assumptions made to reduce the complexity to assess the feasibility of the concept. Important assumptions related to the CCM and WTThM are described in their respective subsections.

Cooling Cycle Model (CCM)

The CCM is a simplified single stage direct-expansion vapor compression refrigeration cycle model. Direct-expansion refers to the evaporator acting as the air handling unit cooling coil, rather than the evaporator cooling an intermediate working fluid that is then sent to the cooling coil in the air handler (such as chilled water). Vapor compression refers to the working fluid refrigerant being evaporated then compressed mechanically to provide the energy input necessary to move heat from a low temperature to a higher temperature reservoir. Direct-expansion air conditioning systems are the most common type used in residential applications.

The idealized cycle contains four primary states, with properties shown below in Table 1, and graphically represented on the pressure-enthalpy (P-h) diagram in FIG. 6. FIG. 6 is a pressure-specific enthalpy diagram that describes the states of the cooling cycle model and demonstrates the improved efficiency of the thermal storage in accordance with an embodiment of the present invention. Enthalpy, h, is a measure of the thermodynamic energy contained in the fluid at a given state, and has units of energy per unit mass [kJ/kg]. As illustrated in FIG. 6, arrows 601 trace the normal air-cooled cycle and arrows 602 trace the cycle operating with the water-cooled condenser in the thermal storage discharge mode. The (') marks denote the state and energy values for the thermal mode of operation. Note the increase in cooling capacity ($Q'_{cooling}$) and decrease in compressor energy required ($W'_{comp}$) for the thermal storage cycle as compared to the normal air-cooled cycle.

TABLE 1

Vapor Compression Cycle State Relations are used as the Basis for the Cooling Cycle Model.

| State | Temperature | Pressure | Phase |
|---|---|---|---|
| 1 | $T_1 = T_{evap}$ | $P_1 = P_{sat}@T_{evap}$ | $X_1 = 1$, Sat. Vapor |
| 2 | $T_2 = ?$ | $P_2 = P_{sat}@T_{cond}$ | Superheated Vapor |
| 3 | $T_3 = T_{cond}$ | $P_3 = P_{sat}@T_{cond}$ | $X_3 = 0$, Sat. Liquid |
| 4 | $T_4 = T_{evap}$ | $P_4 = P_{sat}@T_{cond}$ | $X_4 = ?$, Sat. Mixture |

In the case of the CCM, the condenser and evaporator temperatures ($T_{cond}$ and $T_{evap}$) are assumed to be known, and thus so are their respective saturation pressures. The only unspecified values are the temperature at state 2 ($T_2$) and vapor quality at state 4 ($X_4$), but these can be determined by the thermodynamic processes that occur between each state, which are described below and calculated using Equations 1-4.

Thermodynamic Cycle Processes

State 1-State 2: Isentropic Compression of saturated vapor refrigerant to the saturation pressure of the condenser $$W_{c,actual} = 1/\eta_c m_r \times (h_{2,s} - h_1), \text{ where } s_2 = s_1 \quad (1)$$

State 2-State 3: Isobaric condensation of the refrigerant in the condenser at the temperature of the condenser $$Q_{cond} = m_r \times (h_3 - h_2) \quad (2)$$

State 3-State 4: Isenthalpic Expansion of the refrigerant to the saturation pressure of the evaporator $$m_r h_3 = m_r h_4 \quad (3)$$

State 4-State 1: Isobaric Evaporation of the refrigerant in the evaporator at the temperature of the evaporator $$Q_{evap} = m_r \times (h_1 - h_4) \quad (4)$$

These equations were used to develop the CCM, and while they are idealizations of the real physical processes, they provide a first-principle estimation of the system performance. The known input variables to the model are shown below in Table 2, along with the calculated output values. The CCM calculates power draw, condenser thermal load (the heat rejected from the condenser), cooling capacity delivered to the evaporator, and the Coefficient of Performance (COP). COP is the ratio of cooling capacity to compressor power load and is a measure of system efficiency.

It is important to note that while the condenser temperature is assumed to be known, it is not a constant. Condenser temperature is dependent on the environmental temperature it is rejecting heat into (i.e., the outdoor air temperature, or the temperature of the water in tank 102), as well as the heat transfer performance of the condenser heat exchanger. For this analysis, the details of the condenser heat transfer phenomena will be approximated as a condenser "temperature difference" or "temperature split" value, $TD_{cond}$, between the environment and the actual temperature at which condensation occurs, as shown in Equation 5.

$$T_{cond} = T_{environment} + TD_{cond} \quad (5)$$

TABLE 2

The cooling Cycle Model (CCM) uses specified condenser and evaporator temperatures to calculate power draw, cooling capacity and system performance.

| | Variable | Symbol | Units |
|---|---|---|---|
| Inputs | Evaporator Temp | $T_{evap}$ | ° C. |
| | Condenser Temp | $T_{cond}$ | ° C. |
| | Refrigerant Flow Rate | $m_r$ | $kg_r/s$ |
| | Compressor Efficiency | $\eta_c$ | $(W_{c,insentropic})/(W_{c,actual})$ |
| | Refrigerant Type | Fluid | n/a |
| Outputs | Compressor Power | $W_{c,actual}$ | $kW_{elec}$ |
| | Consumer Thermal Load | $Q_{cond}$ | $kW_{thermal}$ |
| | Cooling Capacity | $Q_{cooling}$ | $kW_{thermal}$ |
| | Coefficient of Performance | COP | $(Q_{cooling})/(W_{c,actual})$ |

Since heat must have a temperature gradient to flow, the refrigerant condensing temperature must necessarily be some amount higher than the environment temperature around the condenser heat exchanger. Additionally, the heat transfer of a regular air-cooled condenser and a water cooled condenser are most likely not the same, but this change in performance can be accounted for by using different $TD_{cond}$ values.

Assumptions

The model is an idealized thermodynamic cycle and does not capture the impact of heat transfer characteristics in the evaporator and condenser. For simplification, it is assumed that the $T_{evap}$ and $T_{cond}$ are specified as known, and $T_{evap}$ is fixed. The assumptions chosen for the evaporator are based on standard HVAC approximations for sizing calculations. For this analysis, different $TD_{cond}$ constants were assumed for the two modes of operation based on general HVAC rules of thumb. The $TD_{cond}$ for an air-cooled condenser is assumed to be approximately 16.5° C. (30° F.), and approximately 5.5° C. (10° F.) for the water-cooled thermal storage condenser. These are rough approximations, but without specifying or assuming many different heat exchanger and flow parameters, these provide a good order of magnitude approximation of heat exchanger performance. Again, the purpose of this analysis is to demonstrate the order of magnitude of the potential impacts on compressor performance from implementing the integrated thermal energy and rainwater storage system 100 of the present invention. The calculated outputs are not meant to be extrapolated to precise performance predictions, but rather demonstrate the overall potential of the system to reduce the on-peak compressor load.

The major simplifying assumptions made in the CCM include:

The cycle is assumed to operate as a near-ideal refrigeration cycle, with no sub-cooling in the condenser or superheating in the evaporator.

The condensation temperatures are assumed to be equal to the environment they are in (i.e., the outdoor air temperature or the bulk tank temperature), plus a constant $TD_{cond}$ offset dependent on the environment.

The evaporation temperature is assumed to be a constant 7.2° C. (45° F.), regardless of time, cooling load, or condenser mode.

The compressor and motor combined are assumed to be 75% efficient, for the purposes of providing reasonable magnitude estimates of power and energy use.

The compressor is assumed to run at a constant efficiency, regardless of pressure head or mass flow rate (i.e., no part-load inefficiencies).

The system is adiabatic and does not suffer any parasitic heat gains or losses.

Water Tank Thermal Model (WTThM)

For the purpose of this analysis, the WTThM is a simple lumped capacitance thermal model, and meant only to calculate the change in bulk temperature of tank 102, based on a heat input. Future iterations will account for thermal gains and losses from the tank, evaporative losses, as well as water collection and consumption. The basic relationship is shown in Equation 6, where $V_{tank}$ is the tank volume, $\rho_{water}$ is the water density at the beginning water temperature, $Cp_{water}$ is the specific heat for water, $T_{Tank\ i}$ is the initial temperature of the tank water, and $T_{Tank\ f}$ is the final temperature of the tank water. The model calculates $T_{Tank\ f}$ based on the input water property parameters and starting tank temperature.

$$T_{Tank\ f} = \frac{\dot{Q}_{cond} \times \Delta t}{Cp_{water} \times \rho_{water} \times V_{tank}} + T_{Tank\ i} \quad (6)$$

The WTThM interacts indirectly with the CCM by taking the condenser heat load $\dot{Q}_{cond}$ as the input, and calculating a new bulk tank temperature $T_{Tank\,f}$ as the output. The CCM model uses an average of $T_{Tank\,i}$ and $T_{Tank\,f}$ plus $TD_{cond,\,water}$ as the $T_{cond}$ when operating the thermal storage system in cooling mode. Thus during the peak hours, and assuming the tank temperature is not exceeding its limit, heat is rejected from the AC system into tank 102, raising the tank temperature. At night, when the system is operating in recharge mode, the tank condenser acts as the evaporator, and heat is pulled out of tank 102 and rejected to the atmosphere at $T_{oa}+TD_{cond,\,air}$.

Assumptions

It is assumed that the heat will dissipate quickly enough into the bulk of the fluid that the local temperature at the condenser coil will be approximately the average bulk temperature. The major simplifying assumptions made in the WTThM include:

The water is assumed to uniformly heat from the initial temperature to final temperature within the time step.

The tank is assumed to be perfectly insulated from the environment, with no parasitic heat losses or gains.

The evaporating temperature in the tank heat exchanger during thermal recharging is assumed to be treated the same as the normal indoor evaporator.

Property Calculations

Property calculations are performed using linear interpolation and iterative guess-and-check from property tables generated using the REFPROP property calculator software by the National Institute of Standards and Technology (NIST).

Estimating the Sizing and Performance of the Energy/Water Storage System

Using the model components described above, an initial order-of-magnitude size is estimated as discussed below. Additionally, the performance of the thermal storage is then subsequently evaluated using real-world weather temperature data, combined with simulated cooling load values from a modeled 1,800 sqft (167 m³) house with a 3 ton capacity HVAC system using BEopt, a building energy simulation software developed by National Renewal Energy Laboratory (NREL). This sized house and HVAC system were chosen because it represents a typical home in Austin, Tex. For all of these calculations, the refrigerant mass flow rate, $m_r$, was assumed to be equal to the value calculated by meeting a 3 ton cooling load with a condenser temperature of 95° F. (35° C.), which is a standard sizing for HVAC sizing calculations.

Proof of Concept: Tank Volume Estimation Based on Static Inputs

Feasibility of the concept of using a rainwater storage collection tank 102 as a thermal storage medium can be assessed by calculating the minimum water volume needed to absorb the condenser heat load, with a specified beginning and ending tank temperature, as shown in Equation 7.

$$V_{tank} = \frac{\dot{Q}_{cond} \times \Delta t (\text{seconds})}{Cp_{water} \times \rho_{water} \times (T_{Tank\,f} - T_{Tank\,i})} \quad (7)$$

Additionally, if a corresponding outdoor air temperature is assumed over the same time period, the average required compressor power for both cases can be calculated and estimated using Equation 8. A larger $f_{power\ reduction}$ is better because it means that the system is drawing that much less power than the modeled no-storage system. The CCM is run for both the cases, using the specified $T_{oa}+TD_{cond,\,oa}$ as the $T_{cond}$ for the regular operation mode and $T_{tank\,avg}+TD_{cond,\,water}$ for the $T_{cond}$ of the thermal storage operation mode. Compressor power during normal operation is represented by $\dot{W}_{c\,Reg}$, and compressor power during thermal storage operation is represented by $\dot{W}_{c\,ThS}$.

$$f_{power\ reduction} = \frac{\dot{W}_{c\,Reg} - \dot{W}_{c\,ThS}}{\dot{W}_{c\,Reg}} \quad (8)$$

The values selected for this preliminary sizing estimation are provided below in Table 3, along with the calculated tank volume requirement. Note: the values are approximate due to rounding.

TABLE 3

The tank volume requirement was calculated as a proof-of-concept using the provided inputs. The values provided are in metric units, with the English unit equivalent provided in the parentheses.

| Inputs | Variable | Value | Units |
|---|---|---|---|
| | $Q_{cond}$ | 10.6 (3) | kW$_{thermal}$ (tons) |
| | $T_{evap}$ | 7.2 (45) | ° C., (° F.) |
| | $T_{oa}$ | 35 (95) | ° C., (° F.) |
| | $T_{Tank\,i}$ | 15.6 (60) | ° C., (° F.) |
| | $T_{Tank\,f}$ | 23.8 (75) | ° C., (° F.) |
| | $TD_{cond,\,oa}$ | 16.5 (30) | ° C., (° F.) |
| | $TD_{cond,\,water}$ | 5.5 (10) | ° C., (° F.) |
| | $\Delta t$ | 14,400 (4) | Seconds, (hrs) |
| Outputs | Variable | Value | Units |
| | $V_{tank}$ | 5.1 (1,350) | m³, (US gal) |
| | $F_{power\ reduction}$ | 0.56 | $\frac{\Delta \dot{W}_c}{\dot{W}_{c\,Reg}}$ |

Based on the specified values, the initial estimate of water volume needed to meet a 3 ton cooling load for 4 hours of continuous operation is approximately 5.1 m³ or 1,350 US gallons. Using the tank's specified initial and final temperatures, and normalizing by tonnage of cooling and number of hours of runtime, yields a water volume requirement factor of approximately 103 gallons per ton per hour. This factor can be used to estimate the approximate volume requirement for a system, operating at the same temperatures, based on desired runtime and approximately cooling load in tons. For 3 tons of cooling to provide 1-7 hours of peak reduction, assuming the specified temperature assumptions, the estimated tank volume would be approximately 340-2,400 gallons.

This volume of water (tank size) is not unrealistically large, and would fall into the range of typical residential rainwater collection systems used for irrigation. Typical rainwater collection systems for residential use can range anywhere from 50 gallons (rain barrels) to 5,000 gallons or even larger, depending on rainfall, collection area, water demand, and budget limitations. The important takeaway is that the estimated thermal storage size is of the same order of magnitude as a large (but not unreasonably so) residential rainwater collection storage tank.

Additionally, based on the tank temperature parameters specified, the CCM estimates the system would yield an estimated average power reduction of over 50% compared to a normal AC system operating at the constant specified outdoor air temperature of 95° F. Reducing the peak power draw of a residential AC by 50% is substantial enough to potentially be worthwhile financially to the utility (if the homeowner pays a flat rate) or to the homeowner (if they have time of use pricing).

Peak Power Reduction and Total Energy Use Calculation

The minimum necessary tank volume was shown to be the same order of magnitude of a typical large rainwater collection system based on a static comparison of operation during the peak period only. To assess the net impact of the thermal storage system on the overall energy use of the home, the CCM was ran over a course of time steps to analyze the system performance over the course of 36 hours. A 36 hour runtime was chosen to graphically show the difference between a night/morning without charging (time steps 0-10) and one with charging (time steps 24-34). For the purpose of this analysis, only one discharge-recharge cycle was considered. Additionally, the analysis was evaluated based on a range of tank sizes to gain a better understanding of the impact of tank volume on system operation.

The thermal storage system was programmed to begin operating at 3 pm, and stop operating either when the temperature reached $T_{Tank}$ for through the hour of 7 pm, whichever occurs first. The thermal system is then programmed to recharge the thermal storage using excess capacity of the normal outdoor condenser, starting at midnight and ending by 10 am. The model was programmed to cool the tank back to within 0.5° C. of the starting temperature.

Hourly average outdoor temperature values used for this analysis are from summer 2011 in Austin, Tex. The cooling load ($Q_{load}$) was modeled using this temperature data along with attributes of a typical 1,800 sqft. house in Austin, Tex. If the cooling capability of the CCM model was greater than the modeled load for that hour, then it is assumed the AC system cycled on for a fraction of that hour equal to the fraction of that hourly load over the hourly cooling capacity, as shown in Equation 9.

$$f_{runtime_n} = \frac{\dot{Q}_{load_n}}{\dot{Q}_{cooling_n}} \quad (9)$$

Conversely, if the cooling capacity calculated by the CCM is less than the cooling load for a given hour, then the excess thermal load is carried forward and added to the load of the next hour. Carrying over excess load continues until the cooling capacity is greater than the hourly load, i.e., $f_{runtime}$ is less than or equal to one. This is essentially modeling the air conditioner's inability to remove all of the thermal energy gains in the house for that hour, with the unmet energy contributing to the thermal load in the next hour.

The model calculates the compressor power demand ($\dot{W}_c$) at each time step, and the total energy consumption over the full time period ($W_{ctot}$) for both system configurations, and then calculates the fractional peak power reduction ($f_{power\ reduction}$, Equation 8) and the energy reduction fraction ($f_{energy\ reduction}$, Equation 10). Similar to $f_{power\ reduction}$, a larger $f_{energy\ reduction}$ is better because it means that the system consumed that much less energy overall than the no-storage system. A negative $f_{energy\ reduction}$ means that the system consumed more than the baseline case.

$$f_{energy\ reduct.} = \frac{\left[\sum_{n=0}^{35} f_{runtime_n} \times \dot{W}_{c_n}\right]_{Norm} - \left[\sum_{n=0}^{35} f_{runtime_n} \times \dot{W}_{c_n}\right]_{ThS}}{\left[\sum_{n=0}^{35} f_{runtime_n} \times \dot{W}_{c_n}\right]_{Reg}} \quad (10)$$

The model was executed using a 36 hour time period starting at midnight. To analyze the maximum potential of the system, this analysis was run using temperatures and a calculated cooling load for the hottest day on record in Austin (Aug. 28-29, 2011), which had a daytime high of 112° F. (44.4° C.). FIG. 7 is a plot of outdoor air temperature as well as the variation in tank temperature on the hottest day of the year for the following cases: no tank (normal operation), and tank sizes of 1,000 gallons (3.8 m³), 2,000 gallons (7.6 m³), 3,000 gallons (11.4 m³), 4,000 gallons (15.2 m³), and 5,000 gallons (18.9 m³) in accordance with an embodiment of the present invention. As FIG. 7 shows, the tanks provide a significantly lower temperature sink for the condenser to reject heat into than the ambient air during the peak period of 3-7 pm.

The 1,000 gallon tank has an obvious plateau shape because the water tank reached its maximum allowable temperature, which caused the model to stop operating the thermal storage condenser and revert back to normal air-cooled operation. The 3,000-5,000 gallon tanks have more than enough thermal capacity to absorb all of the thermal load coming from the house, staying well below the upper bound on tank temperature.

The low temperature heat sink allows the system to operate much more efficiently, as shown by the graph of COP versus time in FIG. 8 in accordance with an embodiment of the present invention. Referring to FIG. 8, the large spike corresponds to the large increase in system performance by using a lower temperature heat sink for the condenser, which corresponds to a reduced compressor power demand. The thermal storage provides a significant benefit because it drastically increases AC system efficiency during a time when it would otherwise be at its lowest, as well as reducing power demand from the grid, when the grid demand is highest.

The impact of the thermal storage on energy use can be seen in FIG. 9, which plots the compressor energy consumption during each hour for the cases shown in FIG. 7 in accordance with an embodiment of the present invention. Note that the thermal storage significantly reduces power demand and energy use during the hours it is operating, although additional energy is consumed in off-peak hours to recharge the system. Even with re-charging, the model calculations suggest that the systems approximately breakeven on total energy use, and some still save energy overall as well, due to avoiding the high inefficiencies of operating at the afternoon high temperatures and recharging during the cooler early morning temperatures instead. Table 4 provides a summary of the performance of the four cases during the time period specified, and using the same water tank temperature bounds set in Table 3 (60-75° F.).

TABLE 4

Cooling cycle model output of thermal storage performance on Aug. 28, 2011 the hottest day on record in Austin, Texas.

| Analysis Case | $f_{energy\ reduct.}$ | $(f_{power\ reduct.})\ PeakAvg.$ |
|---|---|---|
| No Storage | — | — |
| $V_{tank}$ = 1000 gal | −0.02 | 0.46 |
| $V_{tank}$ = 2000 gal | 0.004 | 0.62 |
| $V_{tank}$ = 3000 gal | 0.010 | 0.64 |
| $V_{tank}$ = 4000 gal | 0.013 | 0.66 |
| $V_{tank}$ = 5000 gal | 0.015 | 0.67 |

As can be seen in both Table 4 and FIGS. 7-8 and 10, there are fairly significant power reduction benefits but minor energy savings using all three tank sizes, with increasing performance with increasing tank size. FIG. 10 is a graph depicting the compressor power draw for normal and thermal storage operation versus the time of day in accordance with an embodiment of the present invention. Referring to FIG. 10, FIG. 10 illustrates that the thermal storage drastically reduces the compressor power demand during the peak of non-storage operation, which is the primary benefit of the system to utilities and electric grid operators for peak power reduction.

Referring to Table 4 and FIGS. 7-8 and 10, the model suggests the thermal storage system would reduce the averaged power demand during peak hours by approximately 45-67%, but only save about 1% of the total energy use, when compared against the modeled normal system. Interestingly, the relationship between power reduction and tank size do not appear to be linear. There are definite benefits to using a larger thermal storage tank than a smaller one, but the returns appear to be diminishing. The marginally smaller performance gains from the thermal storage suggest that system benefit asymptotically approaches a maximum theoretical value. The diminishing returns from increasing tank size intuitively makes sense because an extremely large tank would begin to act as an infinite, constant temperature thermal sink and source at the initial tank temperature.

The energy-saving benefits of the system are not as inherent as the peak power reduction capabilities because it is dependent on the outdoor temperature being much higher during peak than during the recharging hours. However, real-world commercial thermal energy storage systems have seen actual savings on the order of 10-20%. The discrepancy in energy savings calculated could be due to a variety of factors (e.g., varying compressor efficiency, different system configuration, etc.).

While the foregoing discusses the present invention in connection with using the integrated thermal energy and rainwater storage system at the residential scale, the principles of the present invention may have cross-over benefit for commercial, industrial and agricultural applications.

Furthermore, while the foregoing discusses the present invention in connection with being used with the power grid, the integrated thermal energy and rainwater storage system of the present invention may be adapted for use in a microgrid or off-grid situation, such as disaster and emergency relief, military bases and humanitarian efforts. The integrated thermal energy and rainwater storage system of the present invention could provide means to minimize the required generation capacity, provide load-leveling capabilities, provide a means to capture and supplement water supplies and provide electricity and water system resiliency.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An integrated thermal energy and water storage system, the system comprising:
    a refrigerant circulation network;
    a storage tank configured to store water, wherein a thermal mass of said water is used as a thermal storage medium;
    a water conveyance system configured to capture, direct and move water from one or more sources into and out of said storage tank;
    an evaporator connected to said refrigerant circulation network, wherein said evaporator is configured to evaporate refrigerant into a refrigerant vapor thereby extracting heat from a cooled space;
    a compressor connected to said refrigerant circulation network, wherein said compressor is configured to pressurize and circulate said refrigerant around said system, wherein said compressor compresses said refrigerant vapor;
    an air-cooled condenser connected to said refrigerant circulation network, wherein said air-cooled condenser is configured to condense said refrigerant vapor thereby removing heat energy from said water in said tank and rejecting said heat energy to the atmosphere; and
    a water-to-refrigerant heat exchanger connected to said refrigerant circulation network, wherein said water-to-refrigerant heat exchanger is configured to either evaporate or condense said refrigerant depending on an operational mode of said system;
    wherein said water in said storage tank is re-cooled by said refrigerant in the late evening and/or early morning, wherein said refrigerant from said compressor is condensed by said water in said water-to-refrigerant heat exchanger during a first mode of operation of said system, wherein said refrigerant is then expanded during said first mode of operation and directed to said evaporator during peak times of electrical demand to be evaporated into said refrigerant vapor, wherein said refrigerant vapor is directed to said water-to-refrigerant heat exchanger during said first mode of operation, wherein said water from said storage tank condenses said refrigerant vapor as opposed to being directed to said air-cooled condenser during said first mode of operation thereby allowing said water from said storage tank to function as a heat sink instead of outdoor air cooling said air-cooled condenser during said peak times of electrical demand.

2. The integrated thermal energy and rainwater storage system as recited in claim 1, wherein in a second mode of operation, compressed and condensed refrigerant from said condenser is routed to a first expansion valve to be expanded and said expanded refrigerant is directed to said water-to-refrigerant heat exchanger to remove heat energy from said water in said storage tank to re-cool said water in said late evening and/or early morning.

3. The integrated thermal energy and rainwater storage system as recited in claim 2, wherein in said second mode of operation, said refrigerant vapor is routed to said compressor to be compressed by said compressor and said compressed refrigerant vapor is routed to said condenser to be condensed into said liquid thereby releasing heat absorbed from said water from said storage tank.

4. The integrated thermal energy and rainwater storage system as recited in claim 1, wherein in a third mode of operation, compressed and condensed refrigerant from said condenser is routed to a first expansion valve to be expanded except during said peak times of electrical demand and said expanded refrigerant is directed to said evaporator to be evaporated into said refrigerant vapor.

5. The integrated thermal energy and rainwater storage system as recited in claim 4, wherein in said third mode of operation, said refrigerant vapor is routed to said compressor to be compressed by said compressor and said compressed refrigerant vapor is routed to said condenser to be condensed into said liquid thereby releasing heat.

6. The integrated thermal energy and rainwater storage system as recited in claim 1, wherein in said first mode of operation, compressed and condensed refrigerant from said water-to-refrigerant heat exchanger is routed to a second expansion valve to be expanded during said peak times of electrical demand and said expanded refrigerant is directed to said evaporator to be evaporated into said refrigerant vapor during said peak times of electrical demand.

7. The integrated thermal energy and rainwater storage system as recited in claim 6, wherein in said first mode of operation, said refrigerant vapor is routed to said compressor to be compressed by said compressor during said peak times of electrical demand and said compressed refrigerant vapor is routed to said water-to-refrigerant heat exchanger to be condensed into said liquid thereby releasing heat during said peak times of electrical demand.

8. The integrated thermal energy and rainwater storage system as recited in claim 7, wherein said first mode of operation continues until a maximum allowable water tank temperature of said storage tank is reached or until a peak load time period ends.

9. The integrated thermal energy and rainwater storage system as recited in claim 1, wherein said water in said storage tank comprises one or more of the following: rainwater, municipal water, well water, gray water, treated wastewater, AC condensate, lake water, river water, ocean water and stormwater runoff.

10. A method for reducing peak electrical demand by air conditioning systems, the method comprising:
routing compressed and condensed refrigerant from an air-cooled condenser to a first expansion valve to be expanded;
directing said refrigerant expanded by said first expansion valve to a water-to-refrigerant heat exchanger to re-cool water in a storage tank during off-peak times of electrical demand in a late evening and/or early morning such that heat is rejected from said storage tank and a water temperature of said storage tank is reduced to a desired lower-bound temperature for a later thermal storage discharge operation, wherein said lower-bound temperature corresponds to a temperature value within a range of temperature values that allows said water to remain in liquid form;
routing said refrigerant from said water-to-refrigerant heat exchanger to a second expansion value or said first expansion valve to be expanded during peak times of electrical demand;
directing said refrigerant expanded by said second expansion value to an evaporator during said peak times of electrical demand to be evaporated into a refrigerant vapor; and
directing said refrigerant vapor to said water-to-refrigerant heat exchanger connected to said storage tank as opposed to being directed to said air-cooled condenser thereby allowing said water in said storage tank to function as a heat sink instead of said air-cooled condenser during said peak times of electrical demand.

11. The method as recited in claim 10 further comprising:
routing compressed and condensed refrigerant from said condenser to said first expansion valve to be expanded in a first mode of operation, wherein said first mode of operation occurs during said off-peak times of electrical demand in said late evening and/or early morning; and
directing said expanded refrigerant to said water-to-refrigerant heat exchanger connected to said storage tank to re-cool said water in said first mode operation.

12. The method as recited in claim 11 further comprising:
routing said refrigerant vapor from said water-to-refrigerant heat exchanger to a compressor to be compressed by said compressor in said first mode of operation; and
routing said compressed refrigerant vapor to said air-cooled condenser to be condensed into a liquid thereby releasing heat absorbed from said water in said storage tank in said first mode of operation.

13. The method as recited in claim 10 further comprising:
routing compressed and condensed refrigerant from said air-cooled condenser to said first expansion valve to be expanded except during said peak times of electrical demand in a second mode of operation, wherein said second mode of operation occurs during said off-peak times of electrical demand during the day; and directing said expanded refrigerant to said evaporator to be evaporated into said refrigerant vapor prior to said peak times of electrical demand in said second mode of operation.

14. The method as recited in claim 13 further comprising:
routing said refrigerant vapor from said evaporator to said compressor to be compressed by said compressor prior to said peak times of electrical demand in said second mode of operation; and
routing said compressed refrigerant vapor to said air-cooled condenser to be condensed into a liquid thereby releasing heat from a cooled space at non-peak times of electrical demand in said second mode of operation.

15. The method as recited in claim 10 further comprising:
routing compressed and condensed refrigerant from said water-to-refrigerant heat exchanger connected to said storage tank to said second expansion valve to be expanded during said peak times of electrical demand in a third mode of operation, wherein said third mode of operation occurs during said peak times of electrical demand; and
directing said expanded refrigerant to said evaporator to be evaporated into said refrigerant vapor during said peak times of electrical demand in said third mode of operation.

16. The method as recited in claim 15 further comprising:
routing said refrigerant vapor from said evaporator to said compressor to be compressed by said compressor during said peak times of electrical demand in said third mode of operation; and
routing said compressed refrigerant vapor to said water-to-refrigerant heat exchanger connected to said storage tank to be condensed into a liquid thereby releasing heat during said peak times of electrical demand into said water in said third mode of operation.

17. The method as recited in claim 16, wherein said third mode of operation continues until a maximum allowable water tank temperature of said storage tank is reached or until a peak load time period ends.

18. The method as recited in claim 10, wherein said water in said storage tank comprises one or more of the following: rainwater, municipal water, well water, gray water, treated wastewater and AC condensate.

* * * * *